Figure 1:
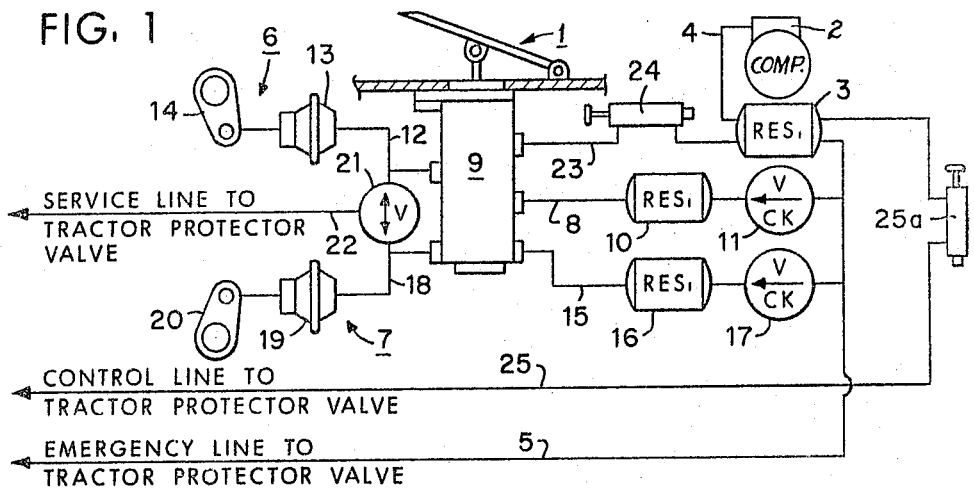

Aug. 16, 1966   R. C. BUELER   3,266,851
CONTROL VALVE AND SYSTEM

Filed Jan. 4, 1965   3 Sheets-Sheet 1

INVENTOR
RICHARD C. BUELER
BY
Joseph E. Papin

Aug. 16, 1966 R. C. BUELER 3,266,851
CONTROL VALVE AND SYSTEM
Filed Jan. 4, 1965 3 Sheets-Sheet 2

INVENTOR
RICHARD C. BUELER
BY
Joseph E. Papin.

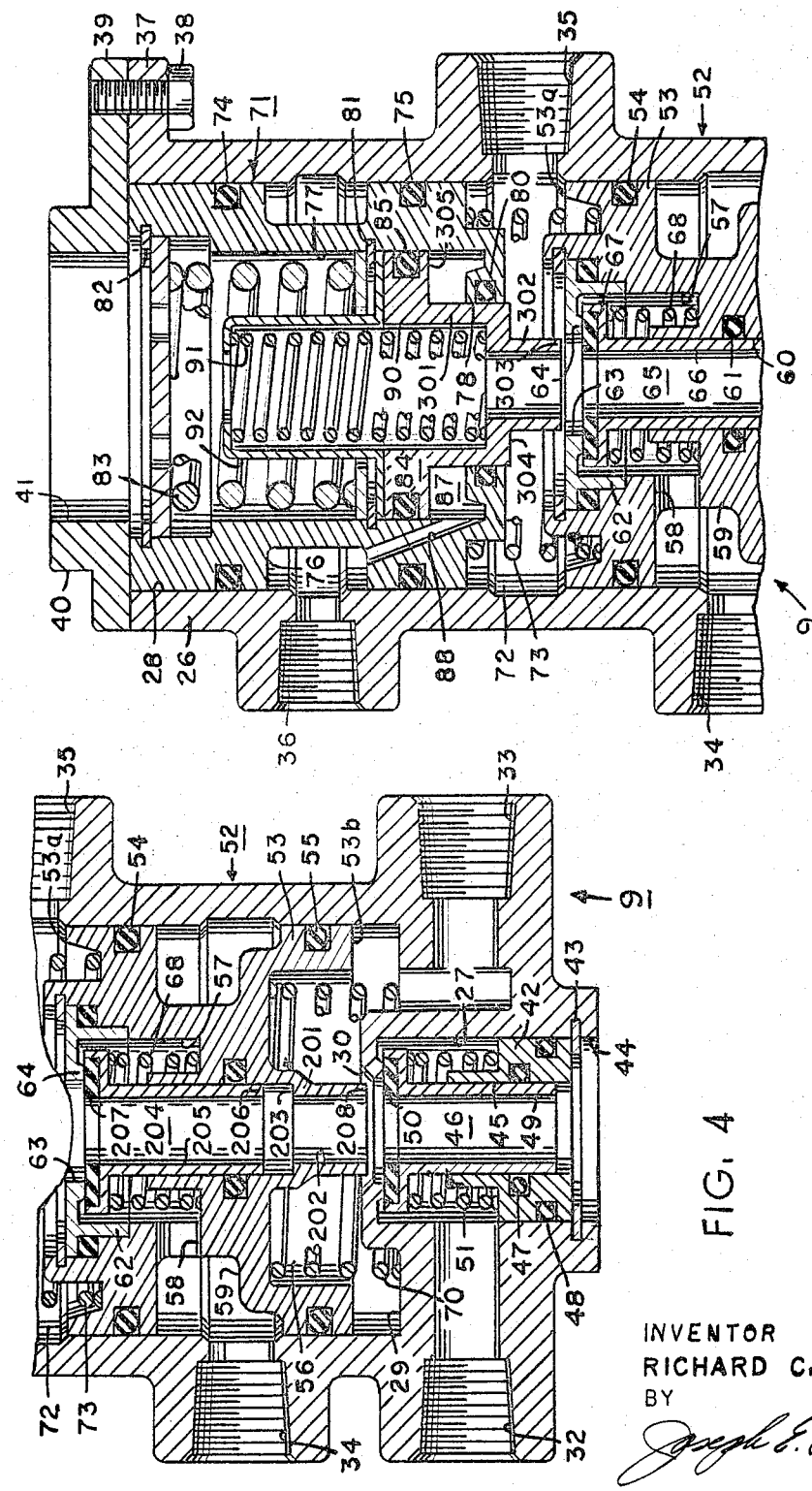

United States Patent Office 3,266,851
Patented August 16, 1966

3,266,851
CONTROL VALVE AND SYSTEM
Richard C. Bueler, Glendale, Mo., assignor to Wagner Electric Corporation, St. Louis, Mo., a corporation of Delaware
Filed Jan. 4, 1965, Ser. No. 423,114
33 Claims. (Cl. 303—52)

This invention relates to dual fluid pressure systems for vehicles and in particular to control valves therefor having emergency means therein for automatically actuating said systems.

In the past, various types of dual or tandem control valves were utilized to effect the energization of separate or dual fluid pressure systems, such as those utilized on tractor-trailer vehicle combinations; however, an undesirable or disadvantageous feature of such past dual control valves and systems was manifested in the inability of the vehicle operator to actuate said systems in the event the operator treadle or treadle linkage to said control valves was lost, disengaged, broken, or for some other reason became inoperable to effect the actuation of said control valves and the resulting energization of said systems.

The object of the present invention is to provide a novel fluid pressure system and control valve means therefor which overcome the aforementioned undesirable or disadvantageous feature and others, and this and other objects and advantageous features of the present invention will become apparent hereinafter.

Briefly, the invention embodies a control valve for a fluid pressure system having a system reservoir connected in uni-directional pressure fluid flow relation with a pair of other reservoirs, and a pair of fluid pressure responsive motors, said control valve comprising means for normally effecting the application of fluid pressure from said other sources to said motors, respectively, including means responsive to a predetermined minimum fluid pressure in said system reservoir to automatically effect the application of fluid pressure between said other sources and motors.

Figure 3:
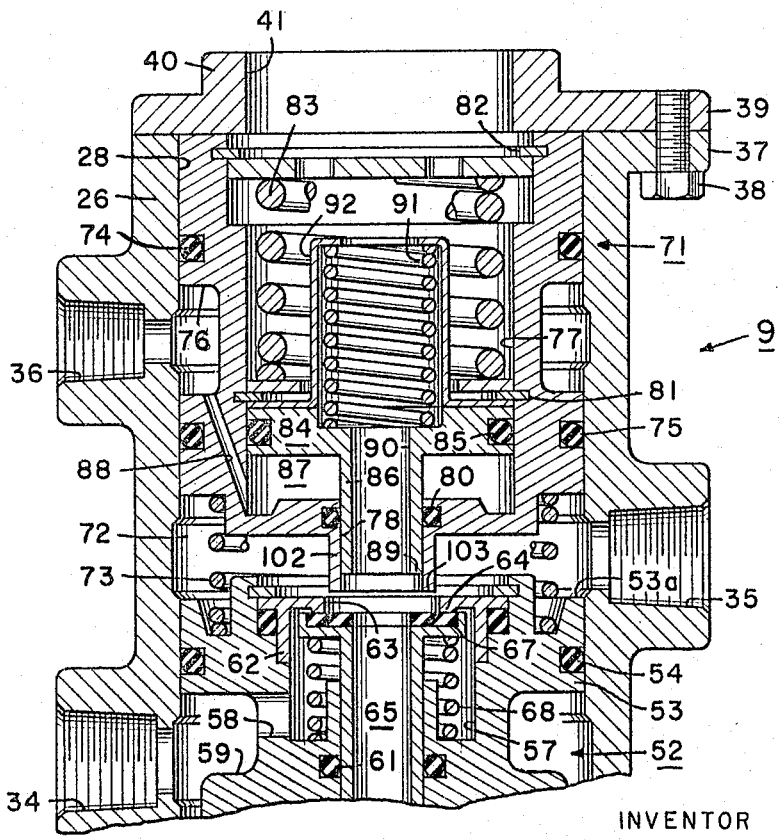
Figure 2:
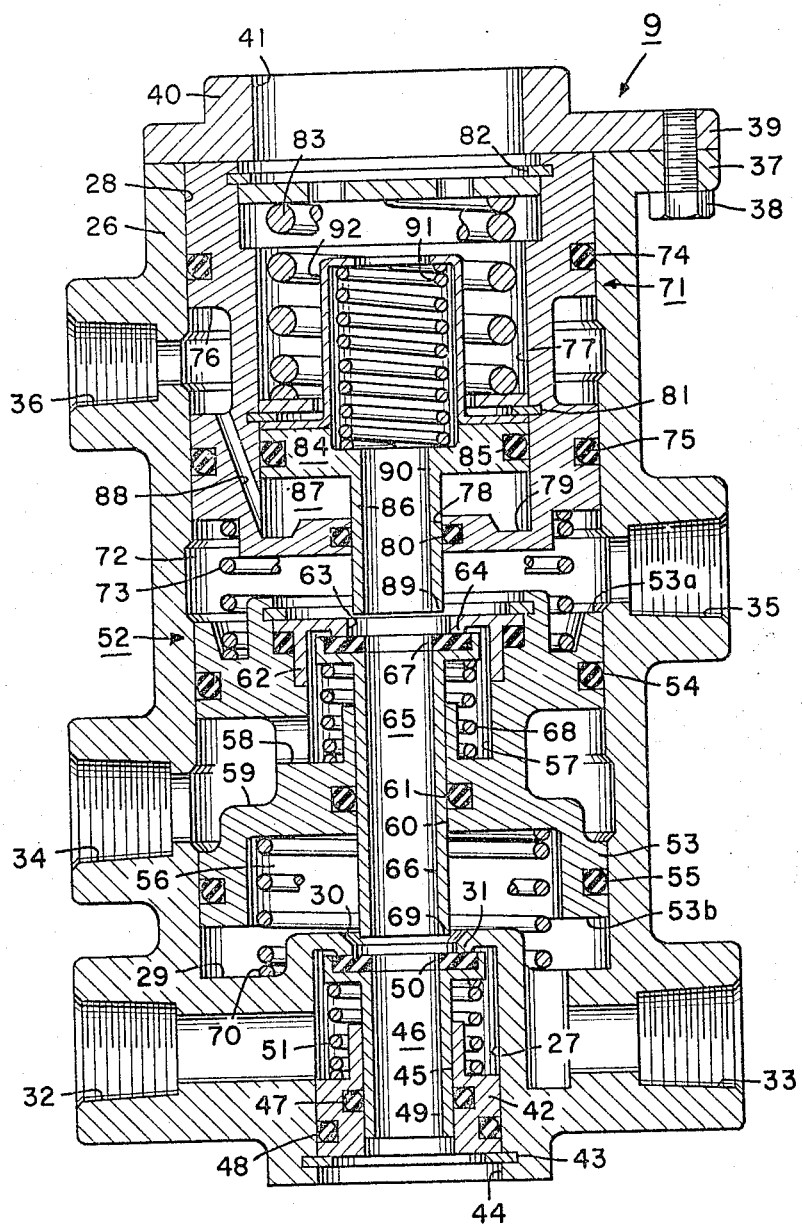

In the drawings which illustrate embodiments of the invention,

FIG. 1 is a diagrammatic view of a fluid pressure system having control valve means therein embodying the present invention, FIG. 2 is a greatly enlarged cross-sectional view of the control valve of FIG. 1, FIG. 3 is a fragmentary view taken from FIG. 2 illustrating a modification of the control valve means embodied in the present invention, FIG. 4 is a fragmentary view taken from FIG. 2 illustrating another another modification of the control valve means embodied in the present invention, and FIG. 5 is another fragmentary view taken from FIG. 2 illustrating still another modification of the control valve means embodied in the present invention.

Referring now to the drawings and in particular to FIG. 1 thereof, a dual or separate fluid pressure system 1, such as that utilized on the tractor of a tractor-trailer vehicle combination, is shown having fluid pressure generating means, such as a compressor 2, connected with a system or main reservoir 3 by a conduit 4, and an emergency line 5 is connected between said main reservoir and the emergency port of a tractor protector valve (not shown) of the type well known to the art, such as that disclosed in United State Patent No. 2,859,763, issued November 11, 1959, to Cyril B. Fites, said emergency line being adapted for operative connection through said tractor protector valve with the emergency portion of the usual trailer braking system, also well known in the art, as illustrated in the aforementioned patent. The system 1 is also provided with separate fluid pressure branches, indicated generally at 6 and 7, for connection with separate axle sets of wheel brake assemblies (not shown) on said tractor. The branch 6 includes a conduit 8 connected in parallel circuit relation between the emergency line 5 and one of a pair of separate inlet ports of a treadle operated tandem control or application valve 9 having a branch or protected reservoir 10 interposed therein, and a uni-directional check valve 11 is connected in the conduit 8 to provide for uni-directional pressure fluid flow from said main reservoir to said protected reservoir. The control valve 9 is also provided with a pair of separate outlet ports, and a tractor service line or conduit 12 connects one of said outlet ports with a fluid pressure responsive motor or brake chamber 13 which is operatively connected with linkage means, such as a slack adjustor 14, to control the energization of a friction device or wheel brake assembly on one tractor axle (not shown). The branch 7 includes a conduit 15 connected in parallel circuit relation between the emergency line 5 and the other of the inlet ports of the control valve 9 having another branch or protected reservoir 16 interposed therein, and a uni-directional check valve 17 is connected in the conduit 15 to provide for unidirectional pressure fluid flow from the main reservoir 3 to the protected reservoir 16. Another tractor service line or conduit 18 is connected between the other of the outlet ports of the control valve 9 and another fluid pressure responsive motor or brake chamber 19 which is operatively connected with linkage means, such as slack adjustor 20, to control the energization of another friction device or wheel brake assembly on another tractor axle (not shown). A two-way valve 21 is connected between the tractor service lines 12, 18 to provide pressure fluid flow from either thereof to another conduit or service line 22 which is connected with the service port of the aforementioned tractor protector valve, said service line 22 being adapted for operative connection through said tractor protector valve with the service portion of the aforementioned, usual, trailer braking system. Another conduit 23 is connected between the main reservoir 3 and a control or emergency port of the control valve 9, and a push-pull hand valve 24 of a type well known to the art is interposed in said conduit 23, said push-pull valve being manually operable between a charging position connecting said control port in pressure fluid communication with said main reservoir and a venting position interrupting pressure fluid communication between said control port and main reservoir and venting said control port to the atmosphere. To complete the description of the system 1, another conduit 25 is connected between the main reservoir 3 and the control port or portion of the aforementioned tractor protector valve having another push-pull hand valve 25a interposed therein, said push-pull valve 25a being similar to the push-pull valve 24 and being manually operable between a charging position connecting said main reservoir in pressure fluid communication with the control portion of said tractor protector valve to thereby effect open pressure fluid communication between the service and emergency lines 22, 5 of the tractor and those of the aforementioned, usual, trailer braking system and a venting position for venting the control portion of said tractor protector valve to the atmosphere thereby interrupting the pressure fluid communication between the service and emergency lines 22, 5 of the tractor and those of the trailer braking systems.

The control valve 9, FIG. 2, is provided with a housing 26 having an axial bore 27 and a counterbore 28 therein, said bore forming an inlet chamber. A radially extending wall 29 is provided on the housing 26 between the bore and counterbore 27, 28, and a connecting passage 30 extends through said wall between said bore and counterbore, said wall having a valve seat 31 thereon in circumscribing relation with said connecting passage. Inlet and outlet ports 32, 33 which receive conduits 15, 18, as previously mentioned, are provided in the housing 26 connecting with the bore and counterbore 27, 28 adjacent to the housing wall 29, respectively. Other inlet and outlet ports 34, 35 which receive the conduits 8, 12, as previously mentioned, are provided in the housing 26, said outlet port 35 connecting with the housing counterbore 28 near the mid-portion thereof and said inlet port 34 connecting with said housing counterbore between the housing wall 29 and said outlet port 35, and an emergency or control port 36 which receives the conduit 23, as previously mentioned, is also provided in said housing connecting with said housing counterbore between the upper end thereof and said outlet port 35. As will become apparent hereinafter, inlet and outlet ports 32, 33 form one separate set of ports, and inlet and outlet ports 34, 35 form another separate set of ports. A plurality of mounting flanges 37 are integrally formed on the housing 26 adjacent to the upper end thereof and are fixedly connected by suitable means, such as studs 38, with like mounting flanges 39 provided on a closure member 40 for the upper end of the housing counterbore 28, said closure member having a guide opening 41 therethrough to receive the force transmitting linkage of an operator controlled lever (not shown).

A valve guide member 42 is positioned in the housing bore 27 against displacement by a snap ring and groove assembly 43 provided adjacent to the lower end of said bore, said lower end of said bore defining an exhaust port 44. The valve guide member 42 is provided with an axial valve bore 45 in which a valve element 46 is slidably received, and seals 47, 48 are carried in said valve guide member in sealing engagement with said valve element and the housing bore 27, respectively. The valve element 46 is provided with an axial exhaust opening or passage 49 therethrough, and an annular resilient seal or disc 50 is provided on the upper end of said valve element in circumscribing relation with said exhaust opening. A valve spring 51 biased between the valve element 46 and the valve guide member 42 normally urges the valve element seal 50 into sealing engagement with the valve seat 31 on the housing wall 29.

A piston or valve control member, indicated generally at 52, is provided with a body 53 slidable in the housing counterbore 28, and seals 54, 55 are carried in said body adjacent to the upper and lower ends 53a, 53b thereof in sealing engagement with said housing counterbore. An outlet or reaction chamber 56 is formed in the housing counterbore 28 between the housing wall 29 and the piston body lower end 53b in open pressure fluid communication with the outlet port 33, and said outlet chamber is normally exhausted to the atmosphere through the valve element exhaust opening 49 and the exhaust port 44. The piston body 53 is provided with a centrally located inlet chamber or bore 57 which is connected by a passage 58 with a peripheral groove 59 provided in said piston body between the seals 54, 55, said peripheral groove being in open pressure fluid communication with the inlet port 34 at all times; and an axial valve receiving or guide bore 60 having a seal 61 disposed therein is provided between the lower end of the valve chamber 57 and the piston body lower end 53b. A wall or sealing member 62 is fixedly positioned in the upper end of the valve chamber 57 against displacement therefrom, and a connecting passage 63 is axially provided through said wall member having a valve seat 64 in circumscribing relation therewith. Another inlet valve element 65 is slidably received in the valve guide bore 60 in sealing engagement with the seal 61, and an axial exhaust opening or passage 66 is provided through said valve element. An annular resilient seal or disc 67 is provided on the upper end of the valve element 65 in circumscribing relation with the exhaust passage 66 and is normally urged into sealing engagement with the wall member valve seat 64 by a valve spring 68 interposed between said valve element and the piston body 53. Another valve seat 69 is provided on the lower end of the valve element 65 in circumscribing relation with the exhaust passage 66, and said valve seat is positioned in the outlet chamber 56 for operative engagement with the valve element 46. A return spring 70 is interposed between the housing wall 29 and the piston body lower end 53b to normally maintain the valve element seat 69 in spaced relation with the valve element 46.

An application member or reaction piston, indicated generally at 71, is slidably received in the housing counterbore 28 between the outlet and control ports 35, 36 and defines with the upper end 53a of the piston 52 an outlet chamber 72 in open pressure fluid communication with said outlet port, and a return spring 73 is interposed between said pistons normally urging the piston 71 toward abutment with the counterbore closure member 40. Spaced seals 74, 75 are carried in the reaction piston 71 in sealing engagement with the housing counterbore 28, and a peripheral groove 76 is provided in said reaction piston between said seals in open pressure fluid communication with the control port 36 at all times. Axially stepped bores 77, 78 are provided through the reaction piston 71 having a radial shoulder 79 formed therebetween, and a seal 80 is disposed in the smaller stepped bore 78. Snap ring and groove assemblies 81, 82 are respectively provided adjacent the mid-portion and upper end of the larger stepped bore 77, and a pre-compressed metering spring and retainer assembly 83 is slidably contained within said larger stepped bore in abutment with said snap rings 81, 82. An emergency or control piston 84 is slidably received in the larger stepped bore 77 having a peripheral seal 85 in sealing engagement therewith, and said control piston is provided with an integral extension 86 slidably received in the smaller stepped bore 78 in sealing engagement with the seal 80. An expansible emergency or control chamber 87 is defined in the larger stepped bore 77 between the control piston 84 and the reaction piston shoulder 79, and a passage 88 is provided in the reaction piston 71 in open pressure fluid communication between the reaction piston peripheral groove 76 and said control chamber. The lower or free end of the extension 86 extends into the outlet chamber 72 having a valve seat 89 thereon for operative engagement with the valve element 65, and an auxiliary exhaust passage 90 extends coaxially through said valve seat extension and the control piston 84 providing another path for exhausting said outlet chamber through the reaction piston larger stepped bore 77. To complete the description of the control valve 9, an emergency spring 91 has one end connected with the control piston 84 and the other end thereof connected with a hat or cup-shaped retainer 92 to urge said retainer into displacement providing engagement with the snap ring 81.

In the operation of the control valve 9 in the system 1, it is preferred to predetermine substantially simultaneous actuation of the system branches 6, 7 by effecting substantially simultaneous opening of the valve elements 46, 65 which respectively control said branches. This is accomplished by substantially balancing the magnitudes of the combined forces of the valve and return springs 51, 70 and the seating force of the fluid pressure in the inlet chamber 27 acting to maintain the valve element 46 in engagement with the housing valve seat 31 against the magnitudes of the combined forces of the valve and return springs 68, 73 and the seating force of the fluid pressure in the inlet chamber 57 acting to maintain the valve element 65 in engagement with the piston valve seat 64.

Under normal operating conditions with the push-pull valves 24, 25a in the charging positions thereof, fluid pressure generated by the compressor 2 flows through the conduit 4, the main reservoir 3 and the conduit and push-pull valve 23, 24 into the control 36 of the control valve 9 and therefrom through the reaction piston peripheral groove and passage 76, 88 into the control chamber 87. The fluid pressure so established in the control chamber 87 acts on the effective area of the control piston 84 therein to establish an emergency force acting against the compressive force of the emergency spring 91 to move said emergency piston upwardly in the reaction piston bore 77 to its inoperative position in abutting engagement with the spring retainer 92 and the snap ring 81. The fluid pressure generated by the compressor 2 also flows from the main reservoir 3 through the control line and push-pull valve 25, 25a to the control portion of the tractor protector valve and also through the emergency line 5 to the emergency portion of the tractor protector valve. From the emergency line the fluid pressure flows through the conduit 8, the uni-directional valve 11 and protected reservoir 10 of the system branch 6 into the inlet port 34 of the control valve 9 and therefrom through the passage and peripheral groove 58, 59 of the piston 52 into the piston inlet chamber 57. The fluid pressure generated by the compressor 2 also flows through the conduit 15, the uni-directional valve 17 and the protected reservoir 16 of the system branch 7 into the inlet port 32 of the control valve 9 and therefrom the inlet chamber 27. From the foregoing, it is apparent that the reservoirs 10, 16 are protected reservoirs since the uni-directional valves 11, 17 protect said reservoirs against loss of pressure fluid therefrom due to a malfunctioning compressor and/or leaks in the system 1 ahead of said reservoirs 10, 16. With the fluid pressure so established in the protected reservoirs 10, 16 and the emergency chamber 87 of control valve 9, the component parts of said control valve are now positioned as shown in FIG. 2.

If the operator desires to effect a braking application under normal operating conditions, a manually applied force on the metering spring and retainer assembly 83 concertedly moves the reaction and emergency pistons 71, 84 downwardly against the compressive force of the return spring 73 to engage the valve seat 89 on the emergency piston extension 90 with the valve element 65 closing the valve element exhaust passage 66 and the emergency piston exhaust passage 86 to isolate the outlet chamber 72 from the atmosphere. At the same time the manual force is transmitted through the return spring 73 to effect a substantially simultaneous downward movement of the piston 52 against the return spring 70 to engage the valve element seat 69 with the valve element 46 closing the exhaust opening 49 therein to also isolate the outlet chamber 56 from the atmosphere. Further concert downward movement of the reaction and emergency pistons 71, 84 and the piston 52 effects substantially simultaneous disengagement of the valve elements 46, 65 from their seats 31, 64 to establish pressure fluid communication between the inlet and outlet ports 32, 33 and 34, 35, respectively. The pressure fluid flows in the system branch 6 from the protected reservoir 10 through the conduit 8, the inlet port 34, the piston passage and peripheral groove 58, 59 into the inlet chamber 57 and therefrom through the connecting passage 63, the outlet chamber 72 and the outlet port 35 into the service line 12 to actuate the brake chamber 13 which, in turn, rotates the slack adjustor 14 to energize the wheel brake assembly associated therewith. Pressure fluid also flows in the system branch 7 from the protected reservoir 16 through the conduit 15 into the inlet port 32 and therefrom through the inlet chamber 27, the connecting passage 30, the outlet chamber 56 and the outlet port 33 into the service line 18 to actuate the brake chamber 19 which, in turn, rotates the slack adjustor 20 to energize the wheel brake assembly associated therewith. Of course, the two-way valve 21 functions in response to applied fluid pressure in either of the service lines 12, 18 to provide passage thereof through the conduit 22 and the service portion of the tractor protector valve to effect service energization of the trailer braking system in the usual manner. It should be noted that the magnitudes of the fluid pressures so metered by the valve elements 46, 65 through the system branches 6, 7 are substantially equal due to the aforementioned predetermined equalization of the forces which control the sequence of operation of said valve elements, and also since said valve elements are substantially balanced in their open position and the effective fluid pressure responsive areas of the opposed ends 53a, 53b of the piston 52 are substantially equal, the reaction forces of the substantially equal fluid pressure in the outlet chambers 56, 72 acting on said piston opposed ends are self-cancelling.

When the reaction force created by the established fluid pressure in the outlet chamber 72 acting on the effective area of the reaction piston 71 therein equals the manually applied force, the reaction and emergency pistons 71, 84 are concertedly moved upwardly against the metering spring 83, and the force of the return spring 70 effects concerted upward movement of the piston 52 therewith. This concerted upward movement of the reaction and emergency pistons 71, 84 and the piston 52 positions the valve elements 46, 65 in lapped engagement with their seats 30, 64 and positions the valve element and emergency piston valve seats 69, 89 in lapped engagement with the valve elements 46, 65, respectively. The reaction force acting through the metering spring 83 against the manually applied force is substantially equal and opposite thereto and affords the operator an accurate and direct "feel" as to the extent of the braking effort or application. If a greater braking effort is desired, the manually applied force is increased, which results in an increased application force, and the component parts of the control valve 9 function in the same manner as previously described to again move said component parts to the lapped positions.

When the desired braking effort is attained, the manually applied force is removed, and return springs 70, 73 and the reaction forces move the reaction and emergency pistons 71, 84 and the piston 52 upwardly toward their original positions, which disengages the valve seats 69, 89 from the valve elements 46, 65 opening the exhaust passages 49, 66 thereof, along with the emergency piston auxiliary exhaust passage 90 to reestablish communication between the outlet chambers 56, 72 and the atmosphere. In this manner, the wheel brake assembly associated with the brake chamber 19 is de-energized by exhausting fluid pressure from said brake chamber through service line 18, the outlet port 32, the outlet chamber 56, the connecting passage 30 and the valve element exhaust opening 49 to the exhaust port 44. At the same time the wheel brake assembly associated with the brake chamber 13 is also de-energized by exhausting fluid pressure from said brake chamber through the conduit 12, the outlet port 35, the outlet chamber 72, the connecting passage 63 of the piston 52, the valve element exhaust passage 66 and therefrom through the outlet chamber 56 and valve element exhaust opening 49 to the exhaust port 44. Of course, the two-way valve 20 functions to provide simultaneous exhaustion of the service line 22 through the conduit 21 to either of the tractor service lines 11, 17 thereby also effecting exhaustion of the service portion of the trailer braking system in the usual manner.

Under the emergency conditions when the fluid pressure in the main reservoir 3 is reduced or lost due to a malfunctioning compressor and/or leaks or the like in the system 1 ahead of the protected reservoirs 10, 16, the fluid pressure in the emergency chamber 87 of the control valve 9 is correspondingly reduced along with the emergency force acting on the emergency piston 84. When the fluid pressure in the emergency chamber 87 is so reduced to a predetermined minimum value, the compressive force of the emergency spring 91 overcomes the opposing reduced emergency force and serves to move the emergency piston 84 downwardly in the reaction piston bore 77 relative to the reaction piston 71 to engage the valve seat 89 on the reaction piston extension 86 with the valve element 65 closing the exhaust passage 66 therein and the auxiliary exhaust passage 90 in said emergency piston 84. The seating force of the fluid pressure in the inlet chamber 57 of the piston 52 acting to maintain the valve element 65 engaged with the piston valve seat 64 plus the compressive force of the valve spring 68 obviates the immediate opening of the valve element 65 and serves to transfer the compressive force of the emergency spring 91 to the piston 52 effecting concerted downward movement thereof in the housing counterbore 28 to compress the return spring 70 until the valve seat 69 on the valve element 65 is moved into engagement with the valve element 46 closing the exhaust opening 49 therethrough. In this manner, further downward movement of the emergency piston 84 by the compressive force of the emergency spring 91 effects substantially simultaneous disengagement of the valve elements 46, 65 from their seats 31, 64 to effect pressure fluid communication between the inlet and outlet ports 32, 33 and 34, 35 in the same manner previously described hereinbefore to effect energization of the wheel brake assemblies under emergency conditions. Since the protected reservoirs 10, 16 are protected against a depletion or reduction of the fluid pressure therein by the uni-directional check valves 11, 17 when the fluid pressure in the main reservoir 3 is reduced or depleted, it is obvious that such energization of the wheel brake assemblies under these emergency conditions is effected under full reservoir pressure from the protected reservoirs 10, 16.

In the event that the operator treadle or treadle linkage (not shown) is lost, broken, disengaged from the control valve 9, or for some other reason becomes inoperative for transmitting the applied force to the reaction piston 71, the operator can manually actuate the system 1 to effect or simulate emergency conditions by manually moving the push-pull valve 24 to the venting position thereof to interrupt pressure fluid communication between the main reservoir 3 and the emergency port 36 of the control valve 9 and exhaust said emergency port to the atmosphere. When the system 1 is manually actuated in this manner to effect an emergency condition, fluid pressure in the emergency chamber 87 is vented to the atmosphere through the reaction piston peripheral groove and passage 76, 88, the emergency port 36 and the conduit 23 through the push-pull valve 24. Exhaustion of the fluid pressure from the emergency chamber 87 eliminates the emergency force on the emergency piston 87 thereby permitting the opposing compressive force of the emergency spring 91 to move said emergency piston relative to the reaction piston 71 and effect automatic actuation of the valve elements 46, 65 under emergency conditions, as described hereinbefore, along with the resulting emergency energization of the wheel brake assemblies.

In the event of fluid pressure failure due to leaks or the like in one of the system branches 6 or 7, it is obvious that the fluid pressure in the main reservoir 3 will be reduced in an attempt to replenish the depleted fluid pressure in one of the protected reservoirs 10, 16; therefore, when the fluid pressure in the main reservoir 3 is so reduced to the aforementioned predetermined minimum value, the emergency piston 84 will be moved by the emergency spring 91 to effect automatic actuation of the valve elements 46, 65 to effect pressure fluid communication between one of the inlet and outlet ports 32, 33 or 34, 35. In this manner, the wheel brake assemblies of one of the tractor axles are energized under such emergency conditions.

Referring now to FIG. 3, the reaction piston 71 is provided with an extension 101 having a valve seat 102 on the lower or free end thereof for operative engagement with the valve element 65, and the smaller stepped bore 78 of said reaction piston extends coaxially through said extension and valve seat. The emergency piston extension 86 is slidably received in the smaller stepped bore 78 in sealing engagement with the seal 80, and the valve seat 89 on the free end thereof is adapted for operative engagement with the valve element 65 only under emergency conditions. Under normal operating conditions, FIGS. 2 and 3, the applied force concert movement of the reaction and emergency pistons 71, 84 and the piston 52 engages the valve seat 102 with the valve element 65 and engages the valve seat 69 on the valve element 65 with the valve element 46 to effect substantially simultaneous actuation thereof and the resulting energization and de-energization of the wheel brake assemblies, as previously described hereinbefore.

Under the aforementioned emergency conditions when the fluid pressure in the main reservoir 3 is reduced to a predetermined minimum value, the emergency spring 91 overcomes the reduced emergency force to move the emergency piston 84 downwardly relative to the reaction piston 71 to engage the valve seat 89 with the valve element 65, and thereafter the piston 52 is concertedly downwardly movable therewith, as previously described, to engage the valve seat 69 on the valve element 65 with the valve element 46. Further downward movement of the emergency piston 84 and the piston 52 in response to the emergency spring 91 serves to effect substantially simultaneous actuation of the valve elements 46, 65 and the resulting energization of the wheel brake assemblies under emergency conditions, as previously described.

Referring now to FIG. 4, the piston 52 is provided with an extension 201 integrally formed on the lower end 53b of the piston body 53, and a stepped valve guide bore 202 having a radial shoulder 203 therein extends coaxially through said extension connecting with the inlet chamber 57 of said piston. A valve element 204 having an exhaust opening 205 therethrough is slidably received in the larger stepped guide bore 202 having a lower end 206 for abutment with the shoulder 203 and a resilient disc or seal 207 on the upper end thereof in circumscribing relation with said exhaust opening, said seal 207 being normally urged into engagement with the piston valve seat 64 by the valve spring 68 biased between the valve element 204 and the piston 52. The lower or free end of the extension 201 is provided with a valve seat 208 in circumscribing relation with the guide bore 202 for operative engagement with the valve element 46. From the foregoing, it is obvious that under both normal and emergency operating conditions the extension valve seat 208 is engageable with the valve element 46 to effect actuation thereof.

Referring now to FIGS. 2 and 3, in the event the fluid pressure at the inlet port 34 is lost, the emergency function of the emergency spring 91 will move the emergency piston 84 downwardly to engage and move the valve element 204 to an open position with the lower end 206 thereof in abutting engagement with the shoulder 203 formed in the stepped guide bore 202 of the piston extension 201. This abutting engagement between the valve element 204 and piston shoulder 203 serves to transfer the force of the emergency spring 91 to the piston 52 effecting concerted downward movement thereof against the return spring 70 to engage the extension valve seat 208 with the valve element 46 and effect actuation thereof and the resulting energization of the wheel brake assemblies associated therewith, as previously described.

Referring now to FIG. 5, the emergency piston 84 in the control valve 9 is provided with stepped extensions 301, 302 having a valve seat 303 on the lower or free end thereof in the outlet chamber 72 for operative engagement with the valve element 65. The emergency piston extension 301 is slidable in the reaction piston bore 78 in sealing engagement with the seal 80, and the auxiliary exhaust passage 90 extends coaxially through the stepped extensions 301, 302 and the valve seat. A shoulder 304 is defined between the stepped extensions 301, 302 having an effective area responsive to fluid pressure in the outlet chamber 72, and the effective area of the shoulder 304 is in a predetermined ratio with the effective area of the shoulder 305 on the emergency piston 84 which is responsive to the fluid pressure in the emergency chamber 87.

Under normal operating conditions, the applied force concerted movement of the reaction and emergency pistons 71, 84 and the piston 52 serves to effect substantially simultaneous actuation of the valve elements 65, 56, FIGS. 2 and 5, and the resulting energization of the wheel brake assemblies associated therewith, as previously described hereinbefore.

Under emergency operating conditions when the fluid pressure in the main reservoir 3 is reduced or lost due to a malfunctioning compressor and/or leaks or the like in the system 1, the fluid pressure in the emergency chamber 87 is correspondingly reduced, and since the emergency force on the emergency piston 84 in opposition to the emergency spring 91 is created by the fluid pressure in said emergency chamber acting on the effective area of the shoulder 305, said emergency force is also correspondingly reduced. When the fluid pressure in the emergency chamber 87 is reduced to the predetermined minimum value, the compressive force of the emergency spring 91 overcomes the opposing reduced emergency force and serves to move the emergency piston 84 downwardly in the reaction piston bore 77 relative to the reaction piston 71 to engage the valve seat 303 on the emergency piston extension 302 with the valve element 65. The seating force of the fluid pressure in the inlet chamber 57 of the piston 52 plus the compressive force of the valve and spring 68 obviates immediate opening of the valve element 65 and serves to transfer the compressive force of the emergency spring 91 to move the piston 52 downwardly against the return spring 70 to engage the valve seat 69 on the valve element 65 with the valve element 46. Further concert downward movement of the emergency piston 84 serves to effect the automatic, substantially simultaneous actuation of the valve elements 46, 65 and the resulting energization of the wheel brake assemblies associated therewith, as previously described hereinbefore. The fluid pressure established in the outlet chamber 72 acts on the effective area of the shoulder 304 creating a reaction force which is additive to the emergency force in opposition to the compressive force of the emergency spring 91; therefore, the establishment of the reaction force serves to effect a metered application of fluid pressure by the valve elements 46, 65. In other words, when the output fluid pressure acting on the shoulder 304 attains a magnitude great enough to compensate for the loss of fluid pressure in the emergency chamber 87, the emergency piston 84 is moved upwardly against the emergency piston 71 to effect lapped engagement between the valve elements 46, 65 and their valve seats 31, 64 and between the emergency piston extension valve seat 302 and valve element 65 and between the valve element valve seat 67 and the valve element 64. Further loss of fluid pressure from the system 1 and the emergency chamber 87 will, of course, effect further actuation of the valve elements 46, 65 to increase the magnitude of the output fluid pressure acting on the effective area of the shoulder 304 to compensate for said further fluid pressure loss and return the component parts of the control valve 9 to their lapped position, as described above, under emergency conditions. The metering application of the control valve 9 under these emergency operating conditions provides for smoother or less abrupt energization of the wheel brake assemblies under emergency operating conditions. Further, if the systm 1 is manually actuated by the operator to simulate the emergency operating conditions by actuation of the push-pull valve 24, as previously described hereinabove, the component parts of the control valve 9 will function in the same manner to effect a metered application of fluid pressure.

From the foregoing, it is now apparent that a novel system and novel control valves meeting the objects and advantages set out hereinbefore are provided and that changes or modifications to the precise configurations, shapes or details of the constructions set forth in the disclosure by way of illustration may be made by those skilled in the art without departing from the spirit of the invention, as defined by the claims which follow.

The embodiments of the invention in which an exclusive property or privilege is claimed are defined as follows:

1. A control valve comprising a housing, a pair of valve control members movable in said housing and defining therewith a pair of pressure fluid flow passages, one of said valve control members including valve means controlling pressure fluid flow through one of said flow passages, other valve means controlling pressure fluid flow through the other of said flow passages, said first named valve means having an end portion for operative engagement with said other valve means, said valve control members being movable in response to an applied force to positions wherein said end portion of said first named valve means engages said other valve means and the other of said valve control members engages said first named valve means, and said first named and other valve means being thereafter movable in response to further applied force movement of said valve control members to positions in said flow passages establishing pressure fluid flow therethrough, respectively.

2. The control valve according to claim 1 comprising extension means on said first named valve means extending through said one valve control member into said other flow passage, said end portion being provided on said extension means for operative engagement with said other valve means.

3. The control valve according to claim 2 comprising a pair of exhaust openings in said first named and other valve means normally venting a portion of said flow passages to the atmosphere, respectively, said exhaust openings being closed upon the engagement of said other valve control member with said first named valve means and the engagement of said end portion of said one valve means with said other valve means.

4. The control valve according to claim 1 comprising a pair of sets of ports in said housing, each port set including inlet and outlet ports for respective connection with said flow passages, said one valve control member being movable between said port sets.

5. The control valve according to claim 4 wherein said one and other valve control members, respectively, include first and second piston means, said first named valve means being movable in said first piston means and normally urged toward a closed position therein interrupting pressure fluid communication between the ports of one of said port sets, extension means on said first named valve means movable in said first piston means and extending into juxtaposition with said other valve means, said end portion being provided on said extension means, and said other valve means being movable in said housing and normally urged toward a closed position therein interrupting pressure fluid communication between the ports of the other of said port sets.

6. The control valve according to claim 2 including a pair of valve seats on said housing and on said one valve control member in circumscribing relation with said flow passages, respectively, said first named and other valve means being urged into engagement with said valve seats to normally interrupt pressure fluid flow through said flow passages and being disengaged from said valve seats subsequent to the engagement of said other valve control member with said first named valve means and the engagement of said end portion of said first named valve means with said other valve means in response to the applied force movement of said valve control members.

7. The control valve according to claim 1 wherein one of said flow passages includes a first inlet chamber in said housing, a first outlet chamber defined between said housing and one end of said one valve control member, and a first connecting passage in said housing between said first inlet and outlet chambers, the other of said flow passages including a second outlet chamber defined in said housing between the other end of said one valve control member and said other valve control member, a second inlet chamber defined in said housing between the one and other ends of said one valve control member, and a second connecting passage in said one valve control member between said second inlet and outlet chambers, said other and first named valve means being normally urged to positions closing said first and second connecting passages and interrupting pressure fluid communication therethrough between said first and second inlet and outlet chambers and being movable upon the engagement of said end portion of said first named valve means with said other valve means and the engagement of said other valve control member with said first named valve means in response to the applied force movement of said valve control members to positions opening said first and second connecting passages and establishing pressure fluid communication therethrough between said first and second inlet and outlet chambers, respectively.

8. The control valve according to claim 7 comprising extension means on said first named valve means extending through said one valve control member into said first outlet chamber, said end portion being provided on said extension means in said first outlet chamber for operative engagement with said other valve means.

9. The control valve according to claim 8 comprising first and second exhaust openings extending through said first named valve means and extension means and through said other valve means, respectively, said first exhaust opening normally communicating said second outlet chamber with said first outlet chamber and said second exhaust opening normally communicating said first outlet chamber with the atmosphere, said first exhaust opening being closed to interrupt communication between said first and second outlet chambers upon engagement of said other valve control member with said first named valve means and said second exhaust opening being closed upon engagement of said extension means with said other valve means.

10. A control valve comprising a housing having a bore and counterbore therein, said bore defining a first inlet chamber wall means on said housing between said bore and counterbore, a first inlet port in said housing connected in open pressure fluid communication with said bore, a first outlet port in said housing and connected with said counterbore adjacent to said wall means, a second outlet port in said housing and connected with said counterbore between the open end thereof opposite said wall means and said first outlet port, a second inlet port in said housing connected with said counterbore between said first and second outlet ports, a first piston having opposed ends slidable in said counterbore between said second inlet and outlet ports and between said first and second outlet ports, respectively, a first outlet chamber in said counterbore between one end of said first piston and said wall means in open pressure fluid communication with said first outlet port, a first connecting passage in said wall means between said first inlet and outlet chambers, a first valve seat on said wall means in circumscribing relation with said first connecting passage, first valve means normally urged into engagement with said first valve seat to close said first connecting passage and interrupt pressure fluid communication between said first inlet and outlet ports, means within said first piston defining with said counterbore a second inlet chamber in open pressure fluid communication with said second inlet port, a second piston slidable in said counterbore between the open end thereof and said second outlet port, a second outlet chamber in said counterbore between said second piston and the other end of said first piston in open pressure fluid communication with said second outlet port, a second connecting passage in the other end of said first piston between said second inlet and outlet chambers, a second valve seat on said first piston in circumscribing relation with said second connecting passage, said first piston including second valve means movable therein and normally urged into engagement with said second valve seat to close said connecting passage and interrupt pressure fluid communication between said second inlet and outlet ports, first extension means on said second valve means and extending through the one end of said first piston into said first outlet chamber, said first extension means being movable through said first connecting passage for operative engagement with said first valve means, second extension means on said second piston and movable through said second connecting passage for operative engagement with said second valve means, said first and second pistons being movable in response to an applied force to positions in said counterbore wherein said first and second extension means engage said first and second valve means, and said first and second valve means being thereafter movable in response to further applied force movement of said second piston to positions disengaged from said first and second valve seats to open said first and second connecting passages and establish pressure fluid communication between said first and second inlet and outlet ports, respectively.

11. A control valve comprising a housing, a pair of valve control members movable in said housing and defining therewith a pair of pressure fluid flow passages, a pair of valve means controlling pressure fluid flow through said flow passages, one of said valve means having an end portion extending into one of said flow passages for operative engagement with the other of said valve means, said valve control members being normally movable in response to an applied force to positions in said housing wherein said one valve means engages said other valve means and one of said valve control members engages said one valve means, said one and other valve means being thereafter movable in response to further applied force movement of said one valve control member to positions in said flow passages normally establishing pressure fluid flow therethrough, respectively, said one valve control member including an expansible fluid pressure control chamber, and resiliently urged means opposing fluid pressure expansion of said control chamber, said resiliently urged means being automatically movable in response to fluid pressure in said control chamber less than a predetermined value to engage said one valve means and thereafter actuate said one and other valve means to automatically establish pressure fluid flow through said flow passages.

12. The control valve according to claim 11 comprising a reactive surface on said resiliently urged means responsive to fluid pressure automatically established in the other of said flow passages to oppose movement of said resiliently urged means.

13. The control valve according to claim 11 comprising extension means on said resiliently urged means extending into the other of said flow passages for operative engagement with said one valve means.

14. The control valve according to claim 13 comprising other extension means on said one valve control means for operative engagement with said one valve means upon the applied force movement of said one valve control means, said first named extension means being movable in said other extension means.

15. A control valve comprising a housing having a pair of sets of ports therein, valve control means movable in said housing between said port sets, valve means in said valve control means controlling pressure fluid communication between the ports of one of said port sets, other valve means controlling pressure fluid communication between the ports of the other of said port sets, said first named valve means including extension means movable in said valve control means and extending therethrough for operative engagement with said other valve means, other valve control means movable in said housing for operative engagement with said first named valve means including a pair of relatively movable members, said first named and other valve control means being normally movable in response to an applied force to positions in said housing wherein said extension means engages said other valve means and said other valve control means engages said first named valve means, said first named and other valve means being thereafter movable in response to further applied force movement of said other valve control means to positions normally establishing pressure fluid communication between the ports of said port sets, respectively, an expansible fluid pressure chamber defined between said members, and resilient means for automatically moving one of said members relative to the other of said members in response to fluid pressure in said chamber less than a predetermined value into engagement with said first named valve means and thereafter actuate said first named and other valve means to automatically establish pressure fluid communication between the ports of said port sets, respectively.

16. The control valve according to claim 15 comprising a control port in said housing, and means within said housing including said other member providing passage means between said control port and said control chamber.

17. The control valve according to claim 15 wherein said one member includes second extension means movable in said other member and having an end portion thereon for operative engagement with said first named valve means.

18. The control valve according to claim 17 comprising other extension means on said other member for operative engagement with said first named valve means in response to the applied force movement of said other member, said second extension means being movable in said other extension means.

19. The control valve according to claim 17 comprising a stepped bore in said other member, said one member and extension means being respectively movable in said stepped bore and defining with said other member said control chamber in the larger of said stepped bores.

20. The control valve according to claim 19 comprising a pair of spaced abutment means in said larger stepped bore, retainer means for said resilient means and normally urged by said resilient means into displacement preventing engagement with one of said abutment means, and metering spring means contained in said larger stepped bore between said abutment means.

21. The control valve according to claim 17 wherein said one member is movable against said resilient means in response to fluid pressure in said chamber in excess of the predetermined value toward a normal operative position for concerted applied force movement with said other member, and abutment means on said other member for engagement with said one member and defining the normal operative position thereof.

22. The control valve according to claim 15 comprising a pair of exhaust openings in said first named and other valve means normally venting the outlet ports of said port sets to the atmosphere, respectively, said exhaust openings being closed upon the engagement of said other valve control means with said first named valve means and the engagement of said extension means with said other valve means.

23. The control valve according to claim 15 comprising first and second valve seats in said first named valve control means between the ports of said one port set and on said housing between the ports of said other port set, respectively, said first named valve means being normally urged into engagement with said first valve seat to interrupt pressure fluid communication between the ports of said one port set and said other valve means being normally urged into engagement with said second valve seat to interrupt pressure fluid communication between the ports of said other port set.

24. The control valve according to claim 15 comprising a first inlet chamber in said housing connected with the inlet port of said other port set, said first named valve control means having opposed ends, one of said opposed ends defining with said housing a first outlet chamber connected with the outlet port of said other port set, a first connecting passage in said housing between said first inlet and outlet chambers, a second inlet chamber defined in said first named valve control means between the opposed ends thereof and connected with the inlet port of said one port set, a second outlet chamber defined between the other opposed end of said first named valve control means and said other valve control means and connected with the outlet port of said one port set, a second connecting passage in said other opposed end of said first named valve control means between said second inlet and outlet chambers, said other and first named valve means being respectively urged to positions closing said first and second connecting passages, and said extension means of said first named valve means being movable in said one opposed end of said first named valve control member and extending into said first outlet chamber for operative engagement with said other valve means.

25. A control valve comprising a housing, a pair of application means concertedly movable in said housing and defining therewith a pair of pressure fluid flow passages, said application means being concertedly movable in response to an applied force to positions in said flow passages establishing pressure fluid flow therethrough, one of said application means including an expansible fluid pressure chamber, and resiliently urged means opposing fluid pressure expansion of said chamber, said resiliently urged means being automatically movable in response to fluid pressure in said chamber less than a predetermined value to automatically establish pressure fluid flow through one of said flow passages and concertedly actuate the other of said application means to establish pressure fluid flow through the other of said flow passages.

26. The control valve according to claim 25, wherein said one application means also includes a member movable in said housing, said resiliently urged means defining in said member said chamber and adapted for concerted and relative movement therewith, said member and resiliently urged means being concertedly movable in response to the applied force when the fluid pressure in said chamber exceeds the predetermined value, and said resiliently urged means being automatically movable relative to said member when the fluid pressure in said chamber is less than the predetermined value.

27. The control valve according to claim 26, wherein said one application means includes a member movable in said housing, said resiliently urged means including another member adapted for relative and concerted movement with said first named member and defining therewith said chamber, said first named and other members being concertedly movable in response to the applied force when the fluid pressure in said chamber exceeds the predetermined value, and resilient means engaged with said other member, said resilient means effecting the automatic movement of said other member relative to said first named member when the fluid pressure in said chamber is less than the predetermined value.

28. The control valve according to claim 27, comprising a reactive surface on said other member in said one flow passage and responsive to the established fluid pressure therein to oppose the automatic movement of said other member.

29. The control valve according to claim 27, comprising a pair of additive areas on said other member respectively responsive to fluid pressure in said chamber and that established in said one flow passage, the established fluid pressure in said one flow passage acting on the area therein to establish a force in opposition to the automatic movement of said one member to compensate for the reduction of the additive force of the fluid pressure in said chamber acting on the area therein when the fluid pressure in said control chamber is reduced below the predetermined value.

30. The control valve according to claim 25, comprising valve means in said other application means interrupting pressure fluid flow through said one flow passage, other valve means interrupting pressure fluid flow through said other flow passage, said one and other application means being concertedly movable in response to the applied force to engage and move said first named and other valve means to open positions in said one and other flow passages establishing pressure fluid flow therethrough, and said resiliently urged means being automatically movable to engage and actuate said first named valve means and concertedly move said other application means to actuate said other valve means.

31. The control valve according to claim 30, comprising spaced abutment means on said first named valve means and said other application means, the abutment means on said first named valve means being moved into mechanical driving engagement with the abutment means on said other application means to effect actuation thereof upon the applied force or automatic actuation of said first named valve means in the event of fluid pressure failure in said one flow passage.

32. The control valve according to claim 27 comprising valve means in said other application means interrupting pressure fluid flow through said one flow passage, other valve means interrupting pressure fluid flow through said other flow passage, extension means on said other member extending into said one flow passage for operative engagement with said first named valve means, said first named and other member and said other application means being concertedly movable in response to the applied force to initially engage said extension means and other application means with said first named and other valve means and thereafter move said first named and other valve means to open positions in said one and other flow passages, the automatic movement of said other member and extension means serving to actuate said first named valve means and concertedly move said other application means to actuate said other valve means.

33. The control valve according to claim 28, comprising valve means in said other application means interrupting pressure fluid flow through said one flow passage, other valve means in said other flow passage interrupting pressure fluid flow therethrough, extension means on said one member for operative engagement with said first named valve means, said first named and other members and said other application means being concertedly movable in response to the applied force to engage said extension means and said other application means with said first named and other valve means and thereafter move said first named and other valve means to open positions in said one and other flow passages establishing pressure fluid flow therethrough, and other extension means on said other member and movable in said first named extension means for operative engagement with said first named valve means, the automatic movement of said other member serving to engage said other extension means with said first named valve means to effect actuation thereof and to concertedly move said other application means to actuate said other valve means.

References Cited by the Examiner

UNITED STATES PATENTS

| | | | |
|---|---|---|---|
| 3,207,561 | 9/1965 | Bueler | 303—52 |
| 3,219,396 | 11/1965 | Bueler | 303—52 |
| 3,227,494 | 1/1966 | Alfieri | 303—13 |

EUGENE G. BOTZ, *Primary Examiner.*